J. PODOLSKY.
WATER CLOSET CONNECTION.
APPLICATION FILED MAR. 29, 1912.
1,061,632.
Patented May 13, 1913.
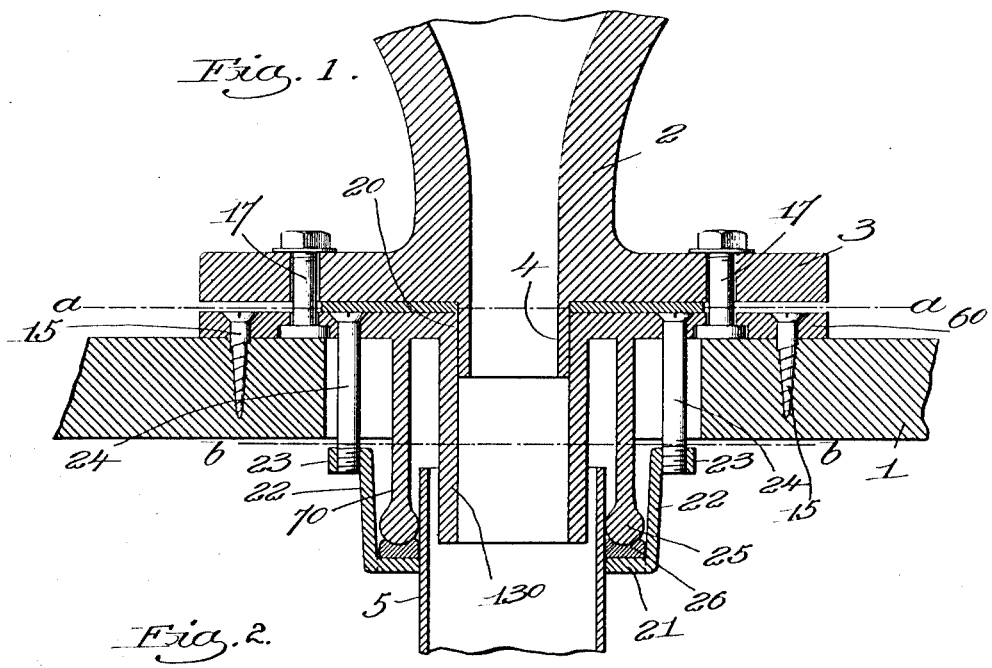
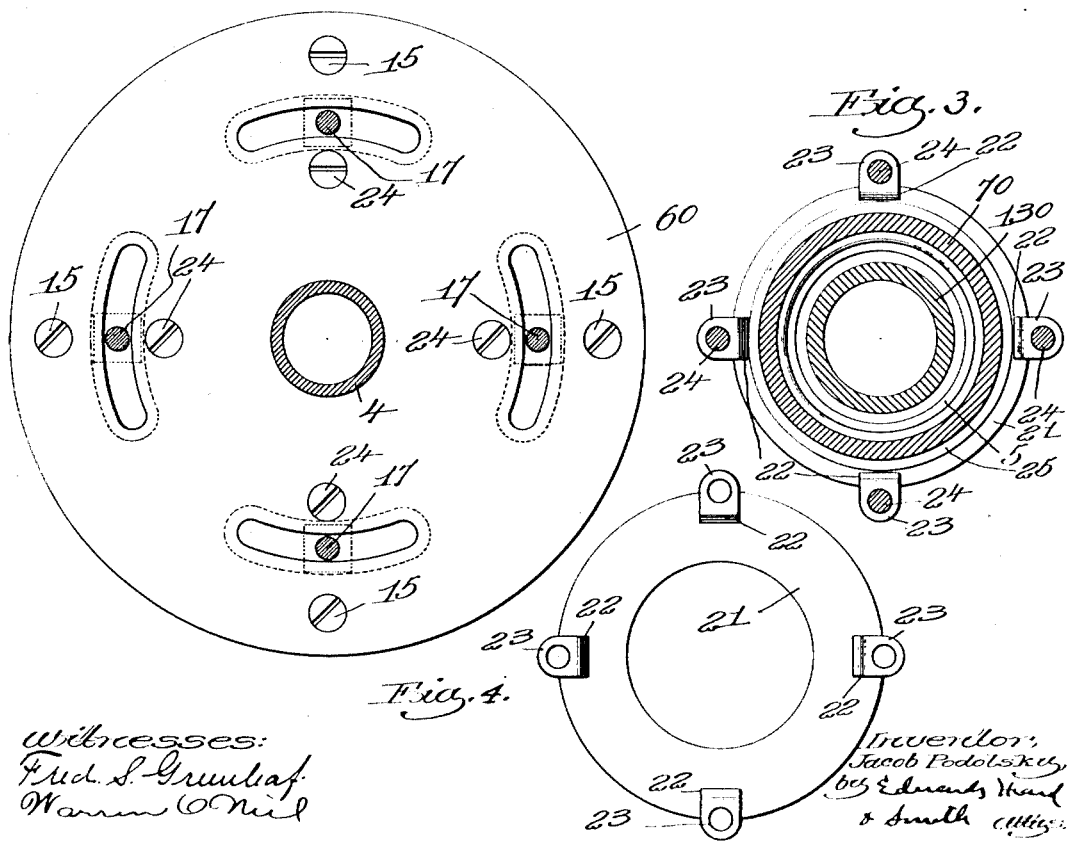
Witnesses:
Fred S. Greenleaf
Warren O'Neil
Inventor:
Jacob Podolsky,
by Edwards &
Smith, attys.

UNITED STATES PATENT OFFICE.

JACOB PODOLSKY, OF BOSTON, MASSACHUSETTS.

WATER-CLOSET CONNECTION.

1,061,632.  Specification of Letters Patent.  Patented May 13, 1913.

Application filed March 29, 1912. Serial No. 687,027.

*To all whom it may concern:*

Be it known that I, JACOB PODOLSKY, a citizen of the United States, residing at Boston, county of Suffolk, State of Massachusetts, have invented an Improvement in Water-Closet Connections, of which the following description, in connection with the accompanying drawing, is a specification, like characters on the drawing representing like parts.

This invention relates to water closet connections and has for its object to provide a simple and inexpensive connection, all as will be more fully hereinafter described and then pointed out in the appended claims.

Referring to the drawings, Figure 1 is a sectional view showing a water closet connection embodying my invention; Fig. 2 is a section on the line a—a, Fig. 1; Fig. 3 is a section on the line b—b, Fig. 1; Fig. 4 is a view of the adjustable clamping collar.

1 designates the floor of a building, 2 the base of a water closet which is shown as provided with a flange 3 and a nipple 4, and 5 is the upper end of a waste pipe. These parts are such as are usually found in water closet connections and form no part of the present invention.

In my invention I employ a floor plate 60 which is provided with a central aperture 20 into which the nipple 4 is inserted and which is also provided with two concentric annular depending flanges 70 and 130, the flange 130 being situated immediately circumjacent the aperture 20, and the flange 70 being situated exterior to the flange 130 and separate therefrom. This floor plate 60 is secured to the floor in any suitable way as by means of screws 15 and the water-closet base is clamped to the floor plate by suitable clamping bolts 17. The upper end of the waste pipe 5 enters between the flanges 130 and 70, it being noted that said flanges extend down through the flooring 1 and sufficiently below the water-closet base to permit the upper end of the waste pipe to be readily entered into the space between them. The inner flange 130, therefore, extends some distance into the waste pipe 5 and the passage through said flange constitutes a continuation of the discharge passage through the water-closet and directs the material to be discharged into the waste pipe.

For making a tight joint around the waste pipe 5, I propose to employ a packing adapted to seal the joint between said pipe and the exterior flange 70. Said flange 70 is preferably provided at its lower edge with the bead 25 which fits the exterior of the pipe 5 and a packing gasket 26 fits against said bead and against the exterior of the pipe 5 and is held firmly in position by means of a clamping collar 21 which encircles the pipe and is provided with means for forcing the packing gasket 26 firmly against the bead 25 and pipe. This is herein accomplished by providing said collar with upwardly-directed arms 22 each having at its upper end a laterally-extending ear 23 and by employing clamping screws 24 which pass down through the floor plate and are screw-threaded into said ears 23. The packing gasket and collar are placed in position before the water-closet is clamped to the floor plate, it being observed that the heads of the clamping screws 24 are readily accessible when the water-closet is removed.

While I have illustrated one embodiment of my invention I do not wish to be limited to the constructional details shown.

Having fully described my invention, what I claim as new and desire to secure by Letters Patent is:—

1. In a water-closet connection, the combination with a water-closet base, of a floor plate having a central aperture and two concentric flanges separated from each other and extending downwardly below the base, the inner flange being immediately circumjacent said aperture, a waste pipe having its upper end entering between the flanges, a packing ring engaging the exterior flange and the exterior of the waste pipe, a clamping collar for holding the packing ring in place, and clamping screws connecting the clamping collar and floor plate for clamping said collar against the packing.

2. In a water-closet connection, the combination with a water-closet base, of a floor plate having a central aperture and having integral therewith two concentric flanges separated from each other and each extending downwardly below said base, the inner flange being immediately circumjacent said aperture, a waste pipe having its upper end entering between said flanges, a packing ring engaging the exterior flange and the exterior of the pipe, and a clamping collar for holding the packing ring in place.

3. In a water-closet connection, the combination with a water-closet base, of a floor plate having two concentric flanges separated from each other and extending downwardly below the base, said plate having an aperture within the interior flange, a waste pipe having its upper end entering between said flanges, the exterior flange having a bead on its lower edge, and means for making a tight joint between said bead and the exterior of the pipe.

In testimony whereof, I have signed my name to this specification, in the presence of two subscribing witnesses.

JACOB PODOLSKY.

Witnesses:
 Louis C. Smith,
 Thomas J. Drummond.